United States Patent
Schmidt et al.

(10) Patent No.: US 6,459,478 B1
(45) Date of Patent: Oct. 1, 2002

(54) OPTICAL LOSS MEASUREMENTS

(75) Inventors: Siegmar Schmidt, Wildberg; Bernd Maisenbacher, Schoemberg, both of (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/339,281

(22) Filed: Jun. 23, 1999

(30) Foreign Application Priority Data

Jul. 15, 1998 (EP) .............................. 98113175

(51) Int. Cl.$^7$ ............................... G01N 21/00
(52) U.S. Cl. ................................. 356/73.1
(58) Field of Search .................... 356/73.1, 44, 479; 359/124, 248, 305, 110, 177; 385/134, 100; 250/227.1–227.28

(56) References Cited

U.S. PATENT DOCUMENTS

| | | | |
|---|---|---|---|
| 4,309,105 A | | 1/1982 | Lebduska |
| 5,090,802 A | * | 2/1992 | Longhurst .................. 356/73.1 |
| 5,625,450 A | * | 4/1997 | Ikeno ....................... 356/73.1 |

FOREIGN PATENT DOCUMENTS

| | | |
|---|---|---|
| EP | 412357 A2 | 7/1990 |
| EP | 453816 A2 | 3/1991 |
| EP | 636868 A1 | 7/1994 |
| EP | 721117 A1 | 7/1996 |

OTHER PUBLICATIONS

European Search Report, EP 98 11 3175, Dec. 18, 1998.
European Search Report, EP 98 11 3175, Apr. 1, 1999.

* cited by examiner

*Primary Examiner*—Frank G. Font
*Assistant Examiner*—Tu T. Nguyen

(57) ABSTRACT

A system for determining an optical loss of a device under test DUT includes a fiber coupler for receiving an optical input power (Ps) at a first input, coupling out a stimulus signal at a first output derived from the optical input power (Ps), receiving a response signal on the applied stimulus signal, and for providing a returning optical power (P) at a third output derived from the received response signal. For calibration, a reference cable with a reflectivity $R_{ref}$ is coupled to the first output of the fiber coupler and a value $P_{ref}$ of the returning optical power is measured. The reference cable is exchanged for a customer cable, whereby an end of the customer cable is provided in a way that no, or substantially no, reflection occurs, and a value $P_{para}$ of the returning optical power is measured. The calibration uses the values $R_{ref}$, $P_{ref}$, and $P_{para}$. For obtaining the return loss of the DUT, the customer cable is coupled between the first output of the fiber coupler and the DUT, whereby an end of the DUT is provided in a way that no, or substantially no, reflection occurs, and a value $P_{DUT}$ of the returning optical power is measured. The return loss of the DUT can then be determined using the values $R_{ref}$, $P_{ref}$, $P_{para}$, and $P_{DUT}$.

8 Claims, 4 Drawing Sheets

OPTICAL LOSS MEASUREMENTS

FIELD OF THE INVENTION

The present invention relates to optical loss measurement which are generally carried out in order to determine the optical characteristics of an optical component

BACKGROUND OF THE INVENTION

A typical optical loss measurement is the return loss measurement. The return loss (RL) of an optical component is generally defined as the ratio of the reflected optical power $P_{back}$ to the incident optical power $P_{in}$, in units of $dB_{opt}$. Therefore, the return loss is usually a positive number with:

$$RL = -10 \log (P_{back}/P_{in}) \text{ in } [dB_{opt}] \quad (\text{eq. 1}).$$

FIG. 1a shows an arrangement for determining the return loss by means of a fiber optical RL-meter 10. The RL-meter 10 comprises a source 20 (e.g. a laser source), a receiver 30 (e.g. an optical power meter), a fiber optical coupler 40, and a connection 50 (e.g. a front panel connector) of the RL-meter 10 to a device under test (DUT) 60.

The fiber optical coupler 40 is normally embodied by a fused fiber coupler as depicted in FIG. 3a. The optical coupler 40 comprises a first fiber with a first end 41 and a second end 42 and a second fiber with a third end 43 and a forth end 44. The first and second fibers are coupled in a way that a signal coming from one side (e.g. end 41) is coupled to the ends (e.g. ends 42 and 43) of the other side. The optical coupler 40 provides a strict directivity, so that the incident beam at one side is split up (e.g. in equal amounts) and provided at the ends of the opposing side, whereas only a small amount (e.g. about $10^{-6 \cdots -7}$) of the incident beam will be reflected to the other end of the side of the incident beam.

When an optical power Ps is provided at the end 41, an optical power M can be measured at the end 42 which substantially corresponds to the optical power Ps, with M=t1·Ps. When an object with a given reflectivity R is coupled to the end 44, a returning optical power P can be measured at the end 43, with:

$$P = c1 \cdot M \cdot R + c2 \cdot M \quad (\text{eq. 2}),$$

whereby c1 and c2 represent general factors depending on the characteristics of the fiber coupler 40.

Before measuring the return loss of the DUT 60, a calibration of the RL-meter 10 needs to be done, e.g. as described by Christian Hentschel, "Fiber Optics Handbook", third Edition, March 1989, Hewlett-Packard, on page 188. As shown in FIG. 1b thereof, a cable 70 is connected to the connector 50. The return loss calibration and measuring procedure consists of three steps. In a first step, a calibration setup is performed with a connector 80 of the cable 70 open. A power meter of the receiver 30 reads a power $P_1$. In a second step, the connector 80 is immersed in oil in order to avoid reflections from the end of the fiber. A measurement of the unwanted reflections from the pair connector 50 and connector 90 of the cable 70 is performed. The power meter now reads $P_2$. The calibration can then be done based on the measured power values $P_1$ and $P_2$. Finally, the DUT 60 is connected to the connector 80 and measurements of the DUT 60 can be performed in a third step (see FIG. 1c).

More details about return loss measurements are also given by Dennis Derickson, Fiber Optic Test and Measurement, ISBN 0-13-534330-5, 1989, e.g. P. 387ff and P. 461ff.

Another typical optical loss measurement is the insertion loss measurement. The insertion loss (IL) of an optical component is generally defined as the ratio of the transmitted optical power $P_{out}$ to the incident optical power $P_{in}$, in units of $dB_{opt}$:

$$IL = -10 \log (P_{out}/P_{in}) \text{ in } [dB_{opt}] \quad (\text{eq. 3})$$

FIG. 2a shows a typical measurement setup for insertion loss measurements using substantially the same measurement components as for the return loss measurement in FIG. 1. The source 20 can be coupled via the fiber coupler 40, or directly, to the connector 50 which again couples via the cable 70 to the DUT 60. Another end of the DUT 60 is coupled via a connector 100 to the receiver 30. Again, before measuring a calibration of the measurement setup generally has to be performed.

FIG. 2b shows a calibration step for the insertion loss measurement. The connectors 80 and 100 are directly coupled together, and the receiver 30 measures the output power $P_{out}$. For measurement purposes, the DUT 60 is inserted between the connectors 80 and 100, as shown in FIG. 2a. More details about typical insertion loss measurements are given by Christian Hentschel, "Fiber Optics Handbook", third Edition, March 1989, Hewlett-Packard, on page 188, or in Dennis Derickson, Fiber Optic Test and Measurement, ISBN 0-13-534330-5, 1989, P. 21–22, P. 339–382 and P. 454–457.

In most applications, the calibration of the return loss measurement is performed using a specific reference cable 70R as the cable 70. The reference cable 70R normally provides a defined return loss and a minimum insertion loss, e.g. due to minimized mechanical tolerances and excellent polishing, and allows a well defined calibration in a defined measurement environment. 'Normal' measurements of the DUT 60 are then carried out using an 'ordinary' so-coled customer cable 70C as the cable 70. It is highly recommended to use different cables for calibration and measuring, since the connector 80 (of the reference cable 70R) might be degraded when frequently changing the DUTs 60

When using different cables 70 for calibration and measuring, however, the insertion loss of the different cables 70 might be different because of mechanical tolerances of fiber optic connectors. A change of x dB at a certain connection will result in a 2x dB measurement error in the return loss measurement and generally decrease its accuracy, since any loss change in the measurement setup will influence the detected power level at the receiver 30. For return loss measurements, the radiation goes twice through the connection of the RL-meter 10 to the attached cable 70, forward and reverse, thus influencing twice the loss change of the return loss measurement result.

Other inaccuracies of the return loss measurement might occur from a variation of the output power (e.g. a drift versus time or temperature) and/or of the optical spectrum of the source 20. This leads to a variation of the insertion and return loss of the components involved in the respective measuring setup, e.g. of the connector 50.

SUMMARY OF THE INVENTION

It is an object of the present invention to provide an improved loss calibration and/or measurement for optical components. The object is solved by the independent claims. Preferred embodiments are given by the dependent claims.

A first aspect of the invention concerns an improved fiber coupler as set out in claim 10 allowing to reduce an influence of reflection on the measuring results.

A second aspect of the invention concerns the calibration of a system for determining an optical loss of a device under test DUT as set out in claim 1, and the determination of a return loss of the DUT as set out in claim 3.

A third aspect of the invention concerns a further improved determination of the return loss of the DUT as set out in claims 5 and 7.

A fourth aspect of the invention concerns the determination of the insertion loss of the DUT as set out in claim 8.

BRIEF DESCRIPTION OF THE DRAWINGS

Other objects and many of the attendant advantages of the present invention will be readily appreciated and become better understood by reference to the following detailed description when considering in connection with the accompanied drawings. Features, which are or can be built up substantially equally or similarly are referred to with the same reference sign.

DETAILED DESCRIPTION OF THE INVENTION

Figure 3A:
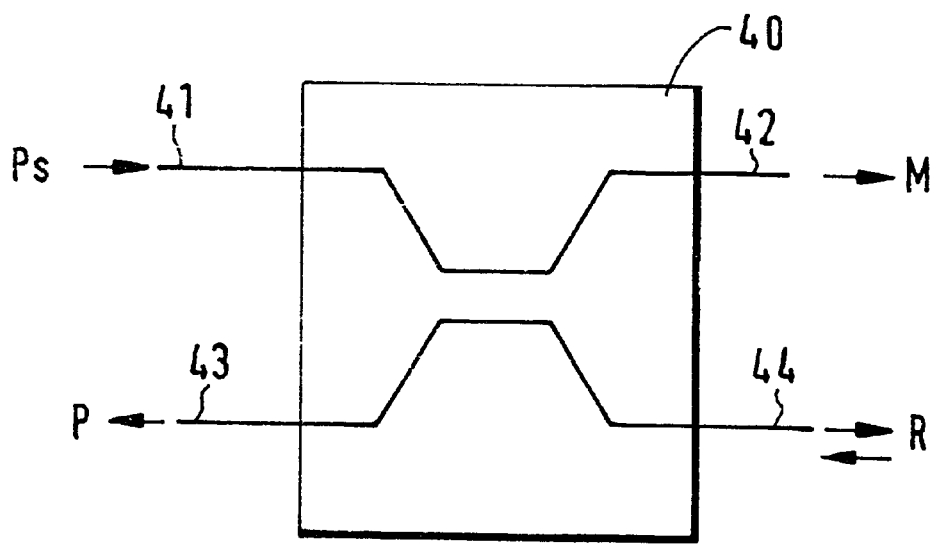
FIG. 3a shows a fiber coupler 40 as known in the art.
Figure 3B:
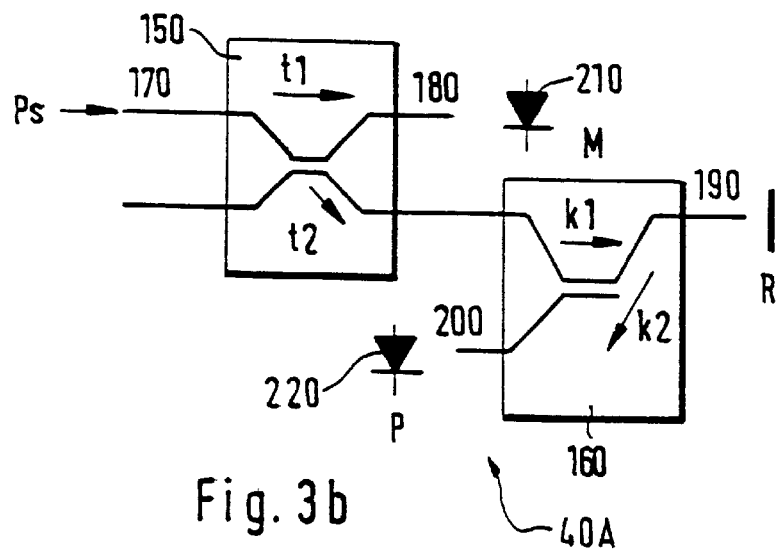
FIG. 3b shows a fiber coupler 40A according to a first aspect of the invention.

FIG. 3b shows an improved fiber coupler 40A according to a first aspect of the invention allowing improved optical loss measurements and evaluation. The fiber coupler 40A comprises a first coupler 150 coupled with one end to a second coupler 160. The first 150 and second 160 couplers provide a strict directivity and can be built up in accordance with the fiber coupler 40 as described above. An optical power Ps from the source 20 can be inserted at a first input 170 of the first coupler 150. The optical power Ps is split up and one part of it (factor t1) is coupled to a first output 180 and another part (factor t2) is coupled to the second coupler 160. The second coupler 160 again couples a part (factor k1) to a second output 190 which can be coupled to the connector 50. A part of the signal output as the second output 190 returns to the second output 190 and is coupled (factor k2) to a third output 200 of the second coupler 160.

In general, the fiber coupler 40A comprises the first input 170 for receiving the optical power Ps from one or more sources, e.g. source 20, the first output 180 for providing an optical power M which substantially corresponds to the optical power Ps at the first input 170, the second output 190 for coupling out a stimulus signal corresponding to the optical power Ps at the first input 170 and for receiving a response signal on the applied stimulus signal, and the third output 200 for providing a returning optical power P which substantially corresponds to the response signal received at the second output 190.

Due to the coupling of the first 150 and second 160 couplers with a strict directivity, the fiber coupler 40A allows a more precise measurement than the fiber coupler 40. The fiber coupler 40A allows to reduce an influence of an reflection, when measuring the optical power M, on the measured returning optical power P.

An optical power meter 210 (e.g. a monitor diode) coupled to the first output 180 measures the optical power M which substantially corresponds to the optical power Ps. at the first input 170:

$$M = t1 \cdot Ps \quad \text{(eq. 4a)}.$$

A second. optical power meter 220, e.g. as part of the receiver 30, coupled to the third output 200, measures the returning optical power P:

$$P = Ps \cdot t2 \cdot k1 \cdot k2 \cdot R + P_{para} \quad \text{(eq. 4b)},$$

whereby R represents the reflectivity of the DUT 60. $P_{para}$ represents a parasitic power caused e.g. by the directivity of the second coupler 160, backscatter e.g. of the cable 70, reflections of connectors, and so on. The parasitic power $P_{para}$ is determined by the optical power M and a scattering factor s:

$$P_{para} = t2 \cdot s \cdot M \quad \text{(eq. 4c)}.$$

By introducing a factor c1, with $$c1 = t2 \cdot k1 \cdot k2 / t1 \quad \text{(eq. 4d)},$$

and a factor c2, with $$c2 = t2 \cdot s \quad \text{(eq. 4e)},$$

the optical power P at the third output 200 can be expressed as above in equation 2:

$$P = c1 \cdot M \cdot R + c2 \cdot M \quad \text{(eq. 2)}.$$

The fiber coupler 40A according to the invention allows an improved monitoring of variations and fluctuations of the source 20, thus improving the accuracy of optical loss measurements.

Since the optical powers P and M in equation 2 can be derived by measurements, it is apparent that there must be at least three different measurements to determine the remaining quantities c1, c2, and R in equation 2.

FIGS. 4a to 4e show different measuring setups for performing calibration and optical loss measurements according to a second and a third aspect of the invention. The invention will be described in the following using the fiber coupler 40A according to the first aspect of the invention. However, it is to be understood that the fiber coupler 40A is only an optional feature which is not required for the second and third aspects of the invention, but only provides a further improved optical loss measurement. Further more, the invention will be described in the following employing adequate means for determing the optical power M. In case that the optical power M will not be measured, all M-ratios (M . . . /M . . . ) in the following equations have to be set to 1.

Figure 1A:
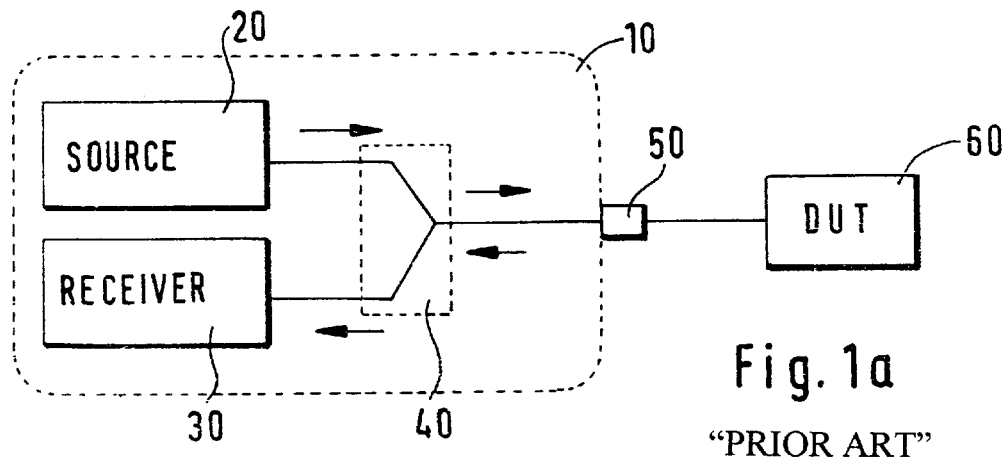
FIGS. 1a, 1b, and 1c show arrangements of the art for determining the return loss by means of a fiber optical RL-meter.
Figure 1B:
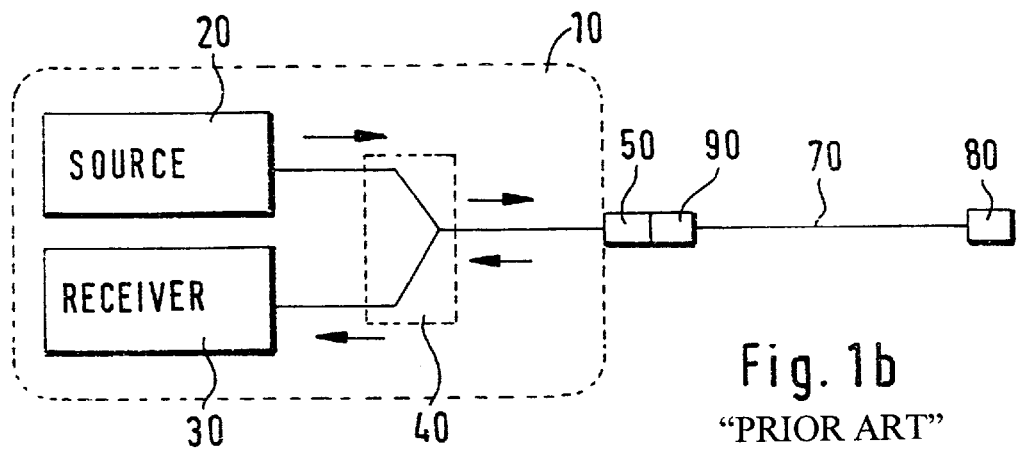
Figure 1C:
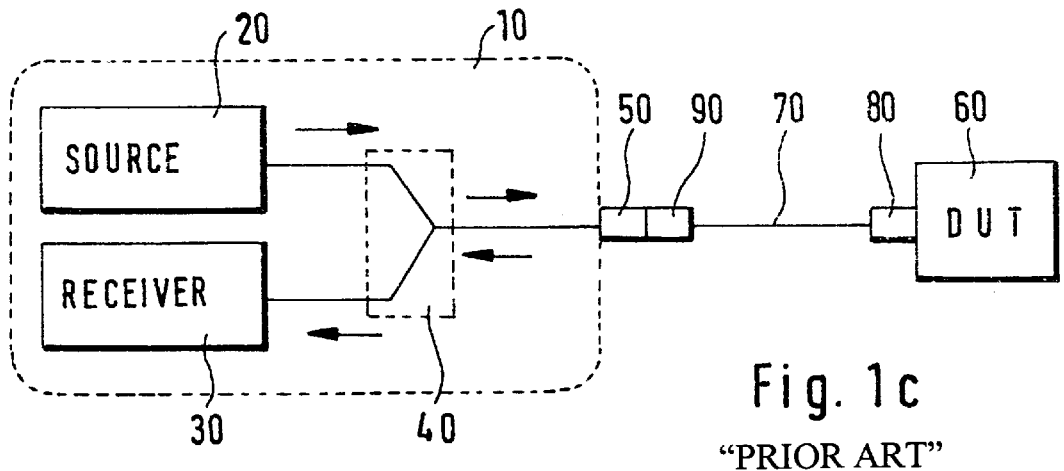
Figure 2A:
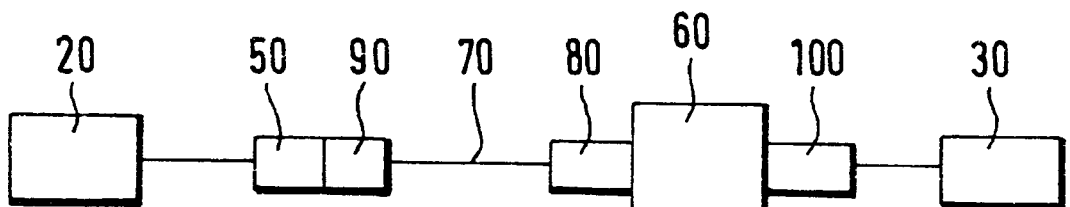
FIGS. 2a and 2b show arrangements of the art for determining the insertion loss.
Figure 2B:
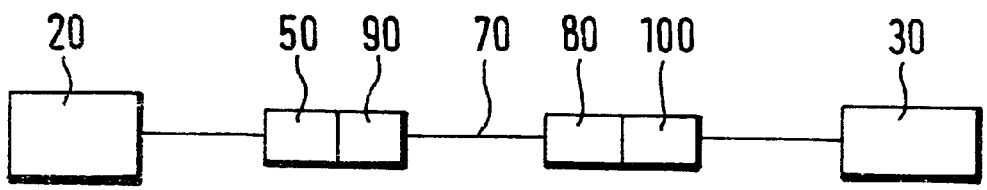

In FIGS. 4a to 4e, the source 20 has to be connected to the first input 170 of the fiber coupler 40A for inserting the optical power Ps, and the optical power meter 210 has to be coupled to the first output 180 for measuring the optical power M. In FIGS. 4a to 4d, the optical power meter 220, e.g. as part of the receiver 30, has to be coupled to the third output 200 for monitoring and measuring a returning optical power P. In case that the fiber coupler 40 of the art is used instead of the fiber coupler 40A according to the first aspect of the invention, the source 20 and the receiver 30 have to be connected as shown in the FIGS. 1 and 2.

The second aspect of the invention concerns an improved return loss measurement and evaluation.

Figure 4A:
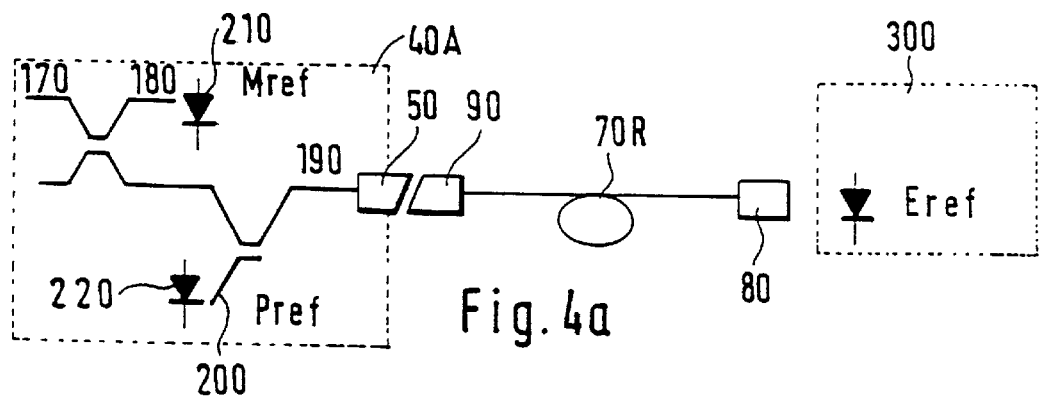
FIGS. 4a to 4e show different measuring setups for performing calibration and optical loss measurements according to a second and a third aspect of the invention.

FIG. 4a shows a first measuring setup for performing a measuring step A The fiber coupler 40A is coupled to the defined reference cable 70R with the connector 80 open. During the measuring step A, the optical power meter 210 measures a value $M_{ref}$ and the optical power meter 220 a value $P_{ref}$.

Figure 4B:
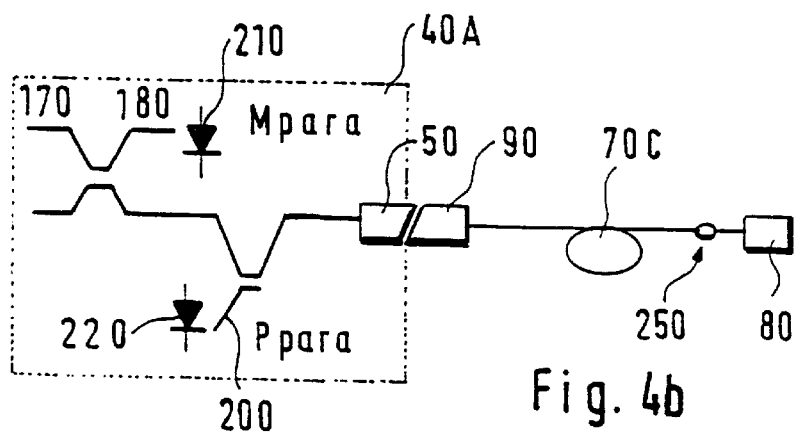

FIG. 4b shows a second measuring setup for performing a measuring step B. The reference cable 70R has been exchanged and the fiber coupler 40A is now coupled to the customer cable 70C. The end of the customer cable 70C has to be provided in a way that no, or substantially no, reflection at the end of the customer cable 70C occurs, so that the reflectivity R=0. This can be done for example, by immersing the end of cable 70C in oil or by providing a termination knot as indicated by arrow 250. During the measuring step B, the optical power meter 210 measures a value $M_{para}$. The optical power meter 220 measures a value $P_{para}$ representing the parasitic behavior of the customer cable 70C and connectors 50, 90, and 80.

Figure 4C:
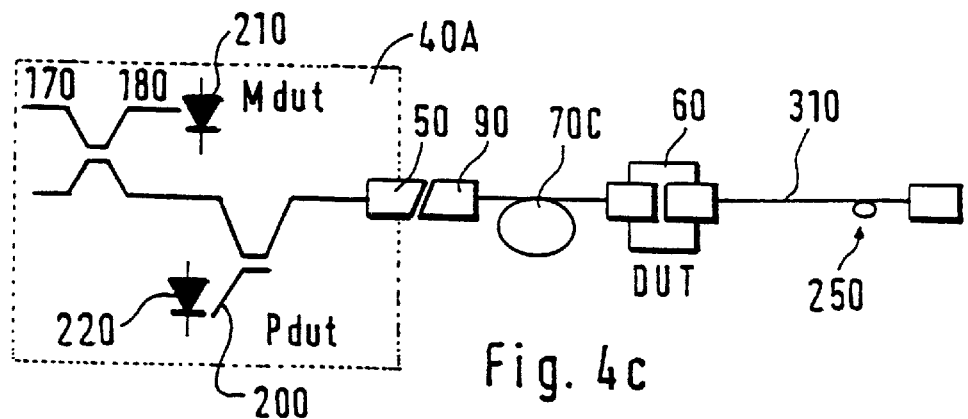
Figure 4D:
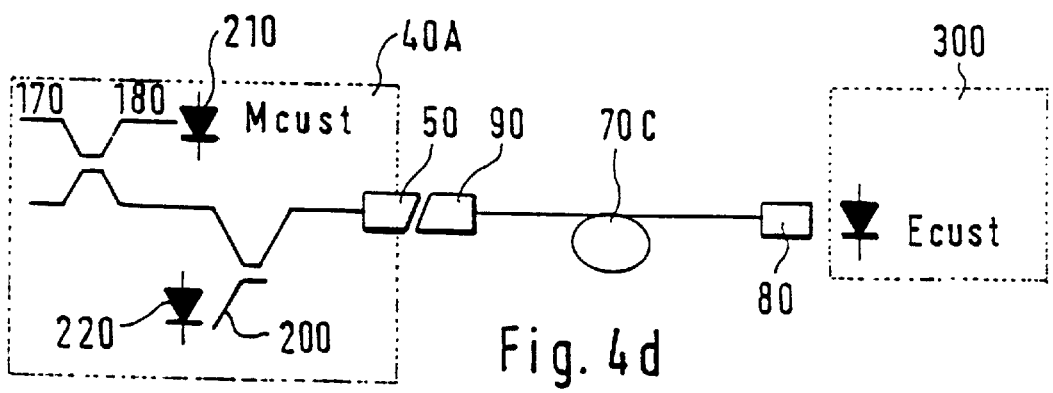

FIG. 4c shows a third measuring setup for performing a measuring step C. The customer cable 70C is now coupled between the fiber coupler 40A and the DUT 60. The end of the DUT 60 has to be provided in a way that no, or substantially no, reflection occurs. This is preferably done, as shown in FIG. 4d, by coupling a further cable 310 at the end of the DUT 60, which is provided in a way as the cable 70C in FIG. 4b. During the measuring step C, the optical power meter 210 measures a value $M_{DUT}$ and the optical power meter 220 measures a value $P_{DUT}$.

Using the results from the measurements of FIGS. 4a, 4b, and 4c in equation 2 leads to:

$$P_{ref}=c1 \cdot M_{ref} \cdot R_{ref}+c2 \cdot M_{ref} \qquad \text{(eq. 5a)}$$

$$P_{para}=0+c2 \cdot M_{para} \qquad \text{(eq. 5b)}$$

$$P_{DUT}=c1 \cdot M_{DUT} 19\ R_{DUT}+c2 \cdot M_{DUT} \qquad \text{(eq. 5c)}.$$

Solving the equations 5a, 5b, and 5c to determine the reflectivity $R_{DUT}$ of the DUT 60 leads to:

$$R_{DUT}=(P_{DUT}-(M_{DUT}/M_{para}) \cdot P_{para})/(P_{ref}-(M_{ref}/M_{para}) \cdot P_{para}) \cdot R_{ref}(M_{ref}/M_{DUT}) \qquad \text{(eq. 6)}$$

The return loss $RL_{DUT}$ of the DUT 60 can be determined as:

$$RL_{DUT}=-10\ \log[R_{DUT}] \qquad \text{(eq. 7a)}.$$

Using equation 6 leads to:

$$RL_{DUT}=-10\ \log[(P_{DUT}-(M_{DUT}/M_{para}) \cdot P_{para})/(P_{ref}-(M_{ref}/M_{para}) \cdot P_{para}) \cdot (M_{ref}/M_{DUT})]-10\ \log[R_{ref}] \qquad \text{(eq. 7b)}$$

and with $RL_{ref}=-10\ \log[R_{ref}]$ to:

$$RL_{DUT}=-10\ \log[(P_{DUT}-(M_{DUT}/M_{para}) \cdot P_{para})/(P_{pref}-(M_{ref}/M_{para}) \cdot P_{para}) \cdot (M_{ref}/M_{DUT})]+RL_{ref} \qquad \text{(eq. 7c)}$$

In case that the optical power M will not be measured, the terms ($M_{ref}/M_{DUT}$) and ($M_{DUT}/M_{para}$) equal to 1, thus leading to the return loss:

$$RL_{DUT}=-10\ \log[(P_{DUT}-P_{para})/(P_{ref}-P_{para})]+RL_{ref} \qquad \text{(eq. 7d)}$$

The return loss $RL_{DUT}$ yields from the above equations 7b, 7c, or 7d by inserting the respective measuring results from the measuring steps A, B, and C.

A more precise evaluation of the measurement setups in FIG. 4, however, reveals that the return loss $RL_{DUT}$ as measured (e.g. by the RL-meter 220) may not be the actual return loss $RLa_{DUT}$ of the DUT 60, but can be influenced by the connection (e.g. connection 50) between the measuring device (e.g. the RL-meter 220) and the DUT 60. The measured value of the return loss $RL_{DUT}$ is influenced by a loss variation term Δ(loss), resulting e.g. from mechanical tolerances, and goes twice into the return loss equation:

$$RLa_{DUT}=RL_{DUT}+2 \cdot \Delta(\text{loss}) \qquad \text{(eq. 8)}.$$

According to the third aspect of the invention, the loss variation term Δ(loss) can be determined by applying an additional power meter 300 for measuring an optical power Eat. the end of the DUT 60 in certain measurement setups.

For improving the measuring step A in FIG. 4a according to the third aspect, the power meter 300 is coupled to the connector 80 of the reference cable 70R. During the measuring step A, the optical power meter 210 measures a value $M_{ref}$ and the optical power meter 300 measures a value $E_{ref}$.

FIG. 4d shows a forth measuring setup for performing a measuring step D for the purpose of the third aspect. The fiber coupler 40A is coupled to the customer cable 70C, and the power meter 300 is now coupled to the connector 80 of the customer cable 70C. During the measuring step D, the optical power meter 210 measures a value $M_{cust}$ and the optical power meter 300 measures a value $E_{cust}$.

Since the optical power E is substantially proportional to the optical power Ps, and thus to the optical power M, the following equations can be set out:

$$E_{ref}=a_{ref} \cdot M_{ref} \qquad \text{(eq. 9a)}$$

$$E_{cust}=a_{cust} \cdot M_{cust} \qquad \text{(eq. 9b)}$$

leading to:

$$(a_{ref}/a_{cust})=(E_{ref}/E_{cust}) \cdot (M_{cust}/M_{ref}) \qquad \text{(eq. 9c)}$$

and with the definition:

$$\Delta(\text{loss})=-10\ \log[(a_{cust}/a_{ref})] \qquad \text{(eq. 9d)}$$

to the loss variation term:

$$\Delta(\text{loss})=-10\ \log[(E_{cust}/E_{ref}) \cdot (M_{ref}/M_{cust})] \qquad \text{(eq. 10a)}.$$

In case that the optical power M will not be measured, the loss variation term is:

$$\Delta(\text{loss})=-10\ \log[(E_{cust}/E_{cust}/E_{ref})] \qquad \text{(eq. 10b)}.$$

Using equation 8, the actual return loss $RLa_{DUT}$ can therefore be determined as:

$$RLa_{DUT}=RL_{DUT}+2 \cdot \Delta(\text{loss}) \qquad \text{(eq. 11a)},$$

and with equation 10a:

$$RLa_{DUT}=RL_{DUT}-20\ \log[(E_{cust}/E_{ref}) \cdot (M_{ref}/M_{cust})] \qquad \text{(eq. 11b)},$$

or equation 10b:

$$RLa_{DUT}=RL_{DUT}-20\ \log[(E_{cust}/E_{ref})] \qquad \text{(eq. 11c)}.$$

Figure 4E:
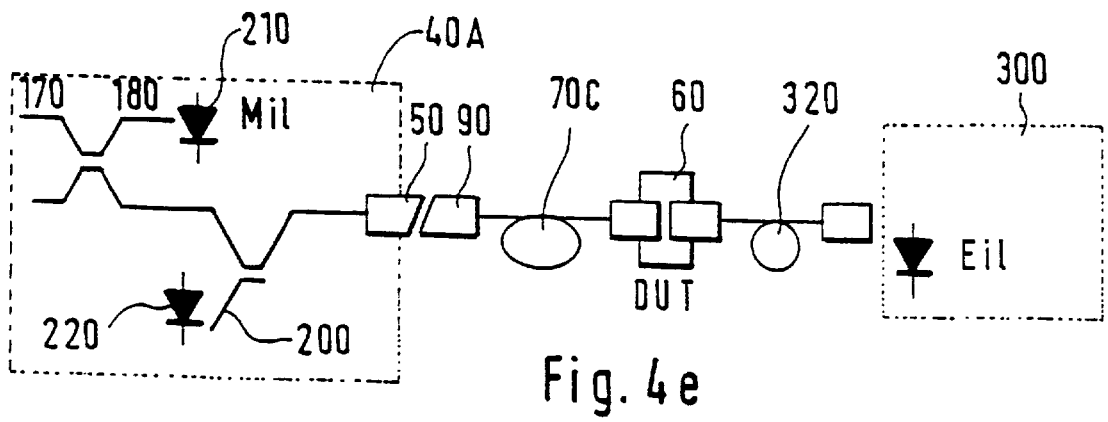

FIG. 4e shows a fifth measuring setup according to a fourth aspect of the invention for determining the insertion loss IL of the DUT 60 performed in a measuring step E. The customer cable 70C is coupled between the fiber coupler 40A and the DUT 60, and the power meter 300 is coupled to end of the DUT 60, preferably via a further cable 320, whereby the cable 310 can be used as the cable 320. During the measuring step E, the optical power meter 210 measures a value $M_{IL}$ and the optical power meter 300 measures a value $E_{IL}$.

Using the definition of the equation 3, the insertion loss $IL_{DUT}$ of the DUT 60 can be determined as:

$$IL_{DUT} = -10 \log[(E_{IL}/E_{cust}) \cdot (M_{cust}/M_{IL})] \qquad \text{(eq. 11a)}.$$

In case that the optical power M will not be measured, the insertion loss $IL_{DUT}$ of the DUT 60 is:

$$IL_{DUT} = -10 \log[(E_{IL}/E_{cust})] \qquad \text{(eq. 11b)}.$$

What is claimed is:

1. A method for determining a return loss of a device under test DUT in a system comprising a fiber coupler for receiving an optical input power (Ps) at a first input, coupling out a stimulus signal at a first output derived from the optical input power (Ps), receiving a response signal on the applied stimulus signal, and for providing a returning optical power (P) at a third output derived from the received response signal; the method comprising:

coupling a reference cable with a reflectivity $R_{ref}$ to the first output of the fiber coupler, and measuring a first value $P_{ref}$ of the returning optical power;

exchanging the reference cable for a customer cable, whereby an end of the customer cable is provided in a way that no, or substantially no, reflection occurs, and measuring a first value $P_{para}$ of the returning optical power;

coupling the customer cable between the first output of the fiber coupler and the DUT, whereby an end of the DUT is provided in a way that no, or substantially no, reflection occurs, and measuring a value $P_{DUT}$ of the returning optical power; and determining the return loss of the DUT by using value $R_{ref}$ first value $P_{ref}$, first value $P_{para}$, and $P_{DUT}$.

2. The method of claim 1 further comprising:

first calibrating said system to determine an optical loss of said device under test DUT, by coupling said reference cable with a reflectivity $R_{ref}$ to the first output of the fiber coupler and measuring an other value $P_{ref}$ of the returning optical power;

exchanging the reference cable for said customer cable, wherein an end of said customer cable, applicable for measuring the DUT, is provided in a way that no, or substantially no, reflection occurs, and measuring an other value $P_{para}$ of the returning optical power; and calibrating the system by using the value $R_{ref}$, other value $P_{ref}$, and other value $P_{para}$.

3. The method of claim 2 wherein the fiber coupler further provides an other reference optical power (M) at a second output derived from the optical input power (Ps), and wherein:

coupling said reference cable with a reflectivity $R_{ref}$ to the first output of the fiber coupler and measuring an other value $P_{ref}$ of the returning optical power comprises measuring an other value $M_{ref}$ of the reference optical power, exchanging the reference cable for said customer cable, wherein an end of said customer cable, applicable for measuring the DUT, is provided in a way that no, or substantially no, reflection occurs, and measuring an other value $P_{para}$ of the returning optical power comprises measuring an other value $M_{para}$ of the reference optical power, and calibrating the system includes using value $R_{ref}$, other value $M_{ref}$, other value $P_{ref}$, other value $M_{para}$, and other value $P_{para}$.

4. The method of claim 1, wherein the fiber coupler further provides a first reference optical power (M) at a second output derived from the optical input power (Ps), and wherein:

coupling a reference cable with a reflectivity $R_{ref}$ to the first output of the fiber coupler, and measuring a first value $P_{ref}$ of the returning optical power comprises measuring a first value $M_{ref}$ of the reference optical power, exchanging the reference cable for a customer cable, whereby an end of the customer cable is provided in a way that no, or substantially no, reflection occurs, and measuring a first value $P_{para}$ of the returning optical power comprises measuring a first value $M_{para}$ of the reference optical power, coupling the customer cable between the first output of the fiber coupler and the DUT, whereby an end of the DUT is provided in a way that no, or substantially no, reflection occurs, and measuring a value $P_{DUT}$ of the returning optical power comprises measuring a value $M_{DUT}$ of the reference optical power; and determining the return loss of the DUT includes using value $R_{ref}$ first value $M_{ref}$ first value $P_{ref}$, first value $M_{para}$, first value $P_{para}$, value $M_{DUT}$, and value $P_{DUT}$.

5. A method for determining a return loss variation term of a device under test DUT in a system comprising a fiber coupler for receiving an optical input power (Ps) at a first input, coupling out a stimulus signal at a first output derived from the optical input power (Ps), receiving a response signal on the applied stimulus signal, and for providing a returning optical power (P) at a third output derived from the received response signal; the method comprising:

coupling a reference cable with one end to the first output of the fiber coupler, and measuring value $E_{ref}$ of an optical output power (E) at the other end of the reference cable;

exchanging the reference cable for a customer cable, and measuring a value $E_{cust}$ of an optical output power (E) at the other end of the customer cable ;and determining the return loss variation term of the DUT by using the measured values $E_{ref}$ and $E_{cust}$.

6. The method of claim 5, wherein the fiber coupler further provides a reference optical power (M) at a second output derived from the optical input power (Ps), and wherein:

coupling a reference cable with one end to the first output of the fiber coupler, and measuring value $E_{ref}$ of an optical output power (E) at the other end of the reference cable comprises measuring a value $M_{ref}$ of the reference optical power, exchanging the reference cable for a customer cable, and measuring a value $E_{cust}$ of an optical output power (E) at the other end of the customer cable comprises measuring a value $M_{cust}$ of the reference optical power, and determining the return loss variation term of the DUT by using the measured values $E_{ref}$ and $E_{cust}$ comprises determining the return loss variation term of the DUT by using the measured values $M_{ref}$, $E_{ref}$, $M_{cust}$, and $E_{cust}$.

7. A method for determining a return loss ($RLa_{DUT}$) of a device under test DUT comprising:

determining a first value of the return loss in a system comprising a fiber coupler for receiving an optical input power (Ps) at a first input, coupling out a stimulus signal at a first output derived from the optical input power (Ps), receiving a response signal on the applied stimulus signal, and for providing a returning optical power (P) at a third output derived from the received response signal by:

coupling a reference cable with a reflectivity $R_{ref}$ to the first output of the fiber coupler, and measuring a first value $P_{ref}$ of the returning optical power;

exchanging the reference cable for a customer cable, whereby an end of the customer cable is provided in a way that no, or substantially no, reflection occurs, and measuring a first value $P_{para}$ of the returning optical power;

coupling the customer cable between the first output of the fiber coupler and the DUT, whereby an end of the DUT is provided in a way that no, or substantially no, reflection occurs, and measuring a value $P_{DUT}$ of the returning optical power; and determining the return loss of the DUT by using the values value $R_{ref}$ first value $P_{ref}$, first value $P_{para}$, and $P_{DUT}$, determining a return loss variation term in said system by:

coupling a reference cable with one end to the first output of the fiber coupler, and measuring value $E_{ref}$ of an optical output power (E) at the other end of the reference cable;

exchanging the reference cable for a customer cable, and measuring a value $E_{cust}$ of an optical output power (E) at the other end of the customer cable ; and determining the return loss variation term of the DUT by using the measured values $E_{ref}$ and $E_{cust}$, and determining a return loss by using the first value of the return loss return and the loss variation term.

8. A system for determining a return loss of a device under test DUT, the system comprising:

a signal source for providing a stimulus signal, a cable coupled with one end to the signal source, whereby the DUT is to be coupled at the other end of the cable during a DUT measuring step for measuring the return loss of the the DUT, a first power meter for measuring a returning optical power (P) of a signal response on the applied stimulus signal, a second power meter for measuring an optical output power (E) at the other end of the cable, and means for determining the return loss of the DUT by using the measured optical output power (E).

* * * * *